United States Patent [19]

Steinhilber

[11] Patent Number: 5,215,419
[45] Date of Patent: Jun. 1, 1993

[54] EXPLOSIVELY DRIVEN FASTENER ASSEMBLY

[76] Inventor: Wilhelm A. Steinhilber, 124 White Birch Dr., Guilford, Conn. 06437

[21] Appl. No.: 925,087

[22] Filed: Aug. 4, 1992

[51] Int. Cl.$^5$ ............................................. F16B 15/00
[52] U.S. Cl. ..................................... 411/440; 411/20
[58] Field of Search ................. 411/455, 439, 440, 20, 411/19

[56] References Cited

U.S. PATENT DOCUMENTS

| | | | |
|---|---|---|---|
| 2,400,878 | 5/1946 | Dunn | 411/440 |
| 2,663,259 | 12/1953 | Catlin et al. | 102/38 |
| 2,944,261 | 7/1960 | Schulz et al. | 411/440 |
| 3,021,746 | 2/1962 | Marsh | 411/441 |
| 3,396,623 | 8/1968 | Willis | 411/20 |
| 4,271,747 | 6/1981 | Bendler et al. | 411/455 X |
| 4,511,296 | 4/1985 | Stol | 411/20 |

OTHER PUBLICATIONS

The Heckler & Koch G11, Charles R. Fagg, American Rifleman, May 1989, p. 70, 3rd P.

Primary Examiner—Rodney M. Lindsey
Attorney, Agent, or Firm—McCormick, Paulding & Huber

[57] ABSTRACT

An explosively driven nail having a head which carries a solid explosive propellent charge. A Zener diode in the form of a thin film of material functions as a primer and is attached to and overlies at least a portion of the exposed end surface of the explosive propellant charge. The primer is electrically detonated.

12 Claims, 1 Drawing Sheet

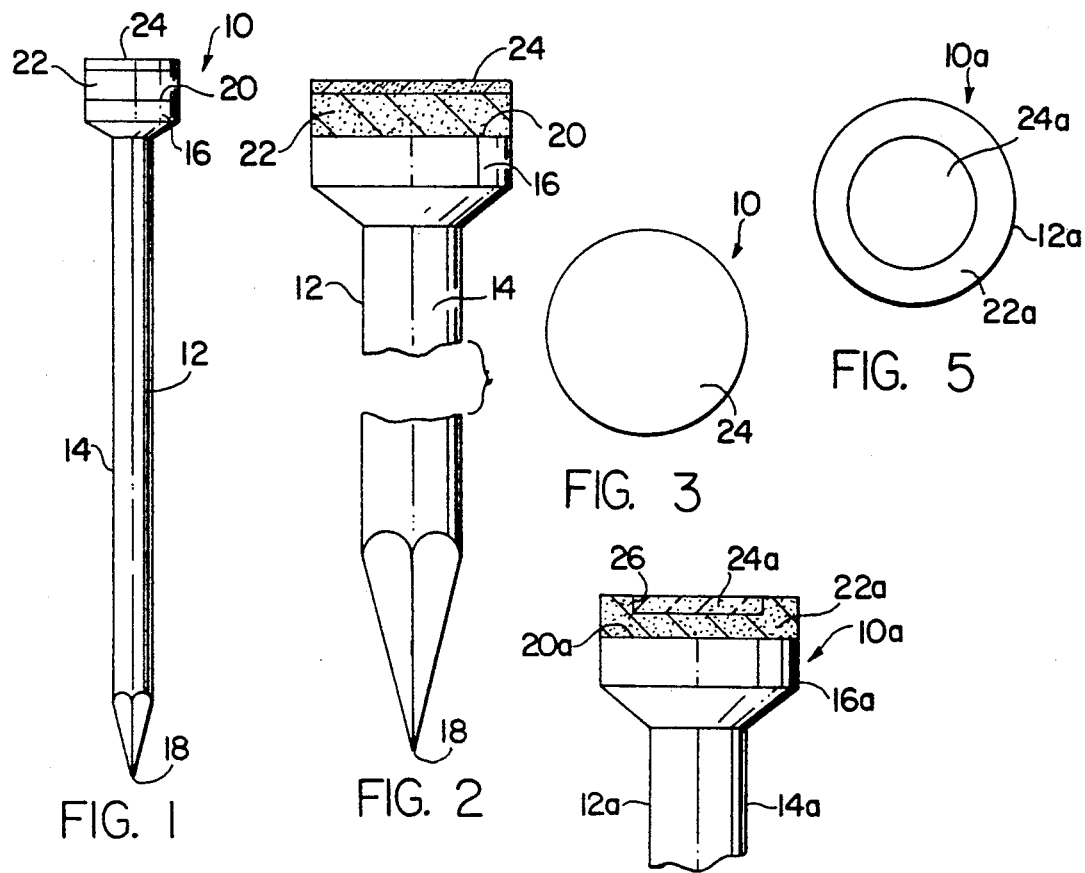
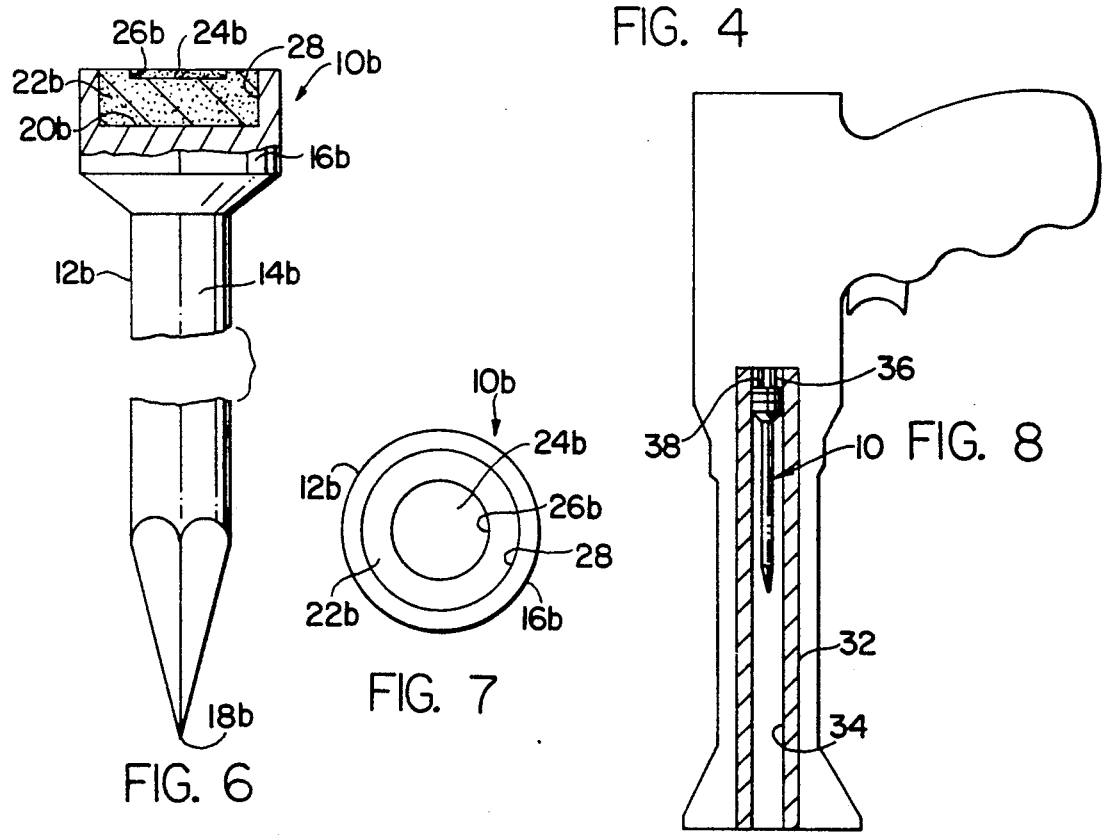

EXPLOSIVELY DRIVEN FASTENER ASSEMBLY

BACKGROUND OF THE INVENTION

This invention relates in general to explosively driven fasteners and deals more particularly with an improved self-propelled fastener assembly which carries an explosive charge and a primer to facilitate explosive driving.

Stud driving tools used to explosively drive fasteners into wood, concrete and steel structures have been known for many years. Tools of this type commonly employ an explosive cartridge to generate gas under high pressure for propelling fasteners through a barrel having a bore into which the fastener is loaded.

Heretofore, self-propelled fasteners have been proposed for use in such tools. Typical examples of such fasteners are found in the following listed U.S. patents.

U.S. Pat. No. 2,663,259, Catlin et al
U.S. Pat. No. 2,944,261, Schulz et al
U.S. Pat. No. 3,021,746, Marsh However, such self-propelled fasteners as heretofore available are generally of somewhat unconventional design, have proven difficult and relatively expensive to produce and have not gained general acceptance. A self-propelled fastener which carries a propellent charge and a conventional shock detonated primer may prove potentially dangerous to handle. Where electrical ignition is employed to detonate the primer the potential risk of detonation by static electricity exists.

Accordingly, it is the general aim of the present invention to provide an improved self-propelled explosively driven fastener which carries an explosive charge and a primer, which may be economically produced and which is safer to handle and use than previously available self-propelled explosively driven fasteners.

SUMMARY OF THE INVENTION

In accordance with the present invention an explosively driven fastener assembly includes an axially elongate fastener having an axially elongate shank and a diametrically enlarged head integrally connected to the shank at one end of the fastener, an explosive propellant charge carried by the head, and means for detonating the propellant charge which includes a semiconductor carried by the charge and having contact surface exposed at the one end.

BRIEF DESCRIPTION OF THE DRAWINGS

FIG. 1 is a fragmentary side elevational view of an explosively driven fastener assembly embodying the present invention.

FIG. 2 is a somewhat enlarged fragmentary side elevational view of the fastener assembly of FIG. 1 shown partially in axial section.

FIG. 3 is a top plan view of the fastener assembly shown in FIGS. 1 and 2.

FIG. 4 is similar to FIG. 2 but shows another fastener assembly.

FIG. 5 is a top plan view of the fastener assembly of FIG. 4.

FIG. 6 is similar to FIG. 2 but shows still another fastener assembly.

FIG. 7 is a top plan view of the fastener assembly of FIG. 6.

FIG. 8 is a somewhat reduced schematic side elevational view of a tool for driving a fastener assembly of the present invention, the barrel of the tool being shown in axial section with a typical fastener assembly loaded therein.

DETAILED DESCRIPTION OF PREFERRED EMBODIMENTS

Turning now to the drawing and referring first particularly to FIGS. 1-3 an explosively driven fastener assembly embodying the present invention is indicated generally by the reference numeral 10. The illustrated fastener assembly 10 essentially comprises a fastener or axially elongate nail 12. The nail 12 may be made from any suitable material, but preferably, and as shown, it is fabricated from metal and has an axially elongate shank 14 which includes an integral generally cylindrical head 16 at one end and a point 18 at the other end. The illustrated head 16 is diametrically enlarged and defines a generally radially disposed driving surface 20. A solid block or cake of explosive propellant material 22 is adhered or otherwise secured at its inner end to the driving surface 20 and is wholly disposed within the boundary defined by the cylindrical peripheral surface of the head. The outer end portion of the solid propellant charge 22 is preferably also radially disposed, substantially as shown.

A semi-conductor or breakdown diode 24 which functions as a primer is adhered or otherwise suitably secured to the outer end surface the charge 22 for detonating the explosive charge. The illustrated diode 24 comprises a Zener diode in the form of a thin film of semi-conductive material.

Referring now to FIGS. 4 and 5 another fastener embodying the present invention is indicated generally at 10a. Like the previously described fastener the illustrated fastener 10a is a nail and has an axially elongated pointed shank 14a and an integral diametrically enlarged head 16a at one end of the shank. A block of explosive material 2a carried by the head has a shallow central recess 26 in its outer or exposed end which receives and contains a semi-conductor or Zener diode 24a. As in the previously described embodiment the breakdown diode 24a is formed as a thin film adhered to the explosive propellant charge 22a. However, the diode 24a overlies only a portion of the outer surface of the charge 22a leaving the remaining surrounding portion of the outer end surface of the charge 22 exposed.

Still another fastener assembly embodying the present invention is indicated generally at 10b in FIGS. 6 and 7. The fastener 10b also comprises a generally conventional nail. However, the nail head 16b defines an outwardly open blind recess 28 which contains a complementary explosive propellent charge 22b. As in the previously described fastener assembly 10a the diode, indicated at 24b, is received within a recess 26b formed in the charge 22b.

A tool for driving an explosive nail assembly embodying the present invention may take various forms. In FIG. 8 a typical tool for explosively driving a nail assembly, such as the assembly 10, is shown somewhat schematically and indicated generally at 30. The tool or nail gun 30 has a barrel 32 which includes a cylindrical bore 34. The cylindrical head of the fastener assembly 10 is substantially equal to the diameter of the bore 34. A pair of electrical contacts 36 and 38 disposed within the inner end of the bore are adapted to engage an exposed contact surface defined by the outer end of the diode 24. The contacts 36 and 38 are connected in an electrical circuit (not shown) adapted to impress upon the Zener diode a threshold voltage capable of causing it to flash or self-destruct. The resulting instantaneous avalanche of current within the diode causes "thermal runaway" resulting in the substantially instantaneous generation of intense heat sufficient to destroy the diode and detonate the propellent charge 22. The cylindrical nail head 16 cooperates with the bore 34 acting as a piston to propel the nail through the bore 34 in response to gases of explosion generated by the detonation of the explosive charge 22 and impinging upon the driving surface 20. The tool 30 will, of course, include the usual safety features found in nail guns so that the muzzle end of the gun must be held firmly against a solid resistive surface to enable the trigger mechanism to be operated to energize the electric circuit to drive a nail.

Nails made in accordance with the invention and employing a semi-conductor or Zener diode as a primer may be adapted to respond to different combinations of threshold voltages. Thus, a nail having a Zener diode which may be triggered by eight volts will not respond to a ten volt trigger circuit output. Thus, a nail which is intended to be driven into concrete may be made to respond to a different voltage than a nail assembly intended to be driven into wood. Accordingly, a safety feature may be built into the fastener system to prevent a fastener which is adapted to be driven into a dense material, such as concrete from being driven into a material of lesser density, such as wood, which could cause the fastener to pass through the material resulting in personal injury or property damage. Code indicia, such as a color code is contemplated to identify each type of fastener with its intended usage.

Since the semi-conductor/primer cannot be triggered by static electricity or mechanical shock the fastener assembly of the present invention is inherently safer than self-propelled fasteners heretofore available.

A propellent produced by the German firm of Dynamit-Nobel and used in caseless ammunition for the HK G11 rifle, designed by a German arms manufacturer, Heckler & Koch, appears to have characteristics particularly suitable for use as an explosive propellent in the self-propelled fastener of the present invention. Reportedly this propellent does not have a nitrocellulose base and contains materials more commonly associated with explosives than with gun propellents.

I claim:

1. An explosively driven fastener assembly comprising a fastener having an axially elongate shank and a diametrically enlarged head integrally connected to said shank at one end of said fastener, an explosive propellent charge carried by said head, and primer means for detonating said explosive propellant charge including a semi-conductor carried by said explosive propellant charge and having contact surface exposed at said one end.

2. An explosively driven fastener assembly as set forth in claim 1 wherein said semi-conductor comprises a breakdown semi-conductor.

3. An explosively driven fastener assembly as set forth in claim 2 wherein said breakdown semi-conductor comprises a Zener diode.

4. An explosively driven fastener assembly as set forth in claim 3 wherein said Zener diode comprises a film overlying at least a portion of said explosive propellent charge.

5. An explosively driven fastener assembly as set forth in claim 1 wherein said explosive propellant charge is adhered to said head.

6. An explosively driven fastener assembly as set forth in claim 5 wherein said semi-conductor is adhered to said explosive propellent charge.

7. An explosively driven fastener assembly as set forth in claim 6 wherein said head has a cavity therein and said propellent charge is disposed within and substantially fills said cavity.

8. An explosively driven fastener assembly as set forth in claim 7 wherein said explosive propellent charge has a recess therein and said semi-conductor is disposed within said recess.

9. An explosively driven fastener assembly as set forth in claim 1 wherein said fastener assembly has code indicia thereon indicative of the electrical characteristics required for detonation of said primer means.

10. An explosively driven fastener assembly as set forth in claim 1 wherein said code indicia comprises a color code.

11. An explosively driven nail assembly comprising a nail having an axially elongate shank having a head at one end and a point at the other end, said head having a recess therein, an explosive charge disposed within said recess, and primer means for detonating said explosive charge including a semi-conductor overlying at least a portion of said explosive charge and having an exposed contact surface.

12. An explosively driven nail assembly comprising a nail having an axially elongate shank and a head integrally connected at its inner end to one end of said shank, said head having a generally radially disposed end surface at its outer end, an explosive charge seated upon and adhered to said outer end, and a semi-conductor carried by and mounted on said explosive charge, said semi-conductor having an exposed contact surface.

* * * * *